Figure 2:
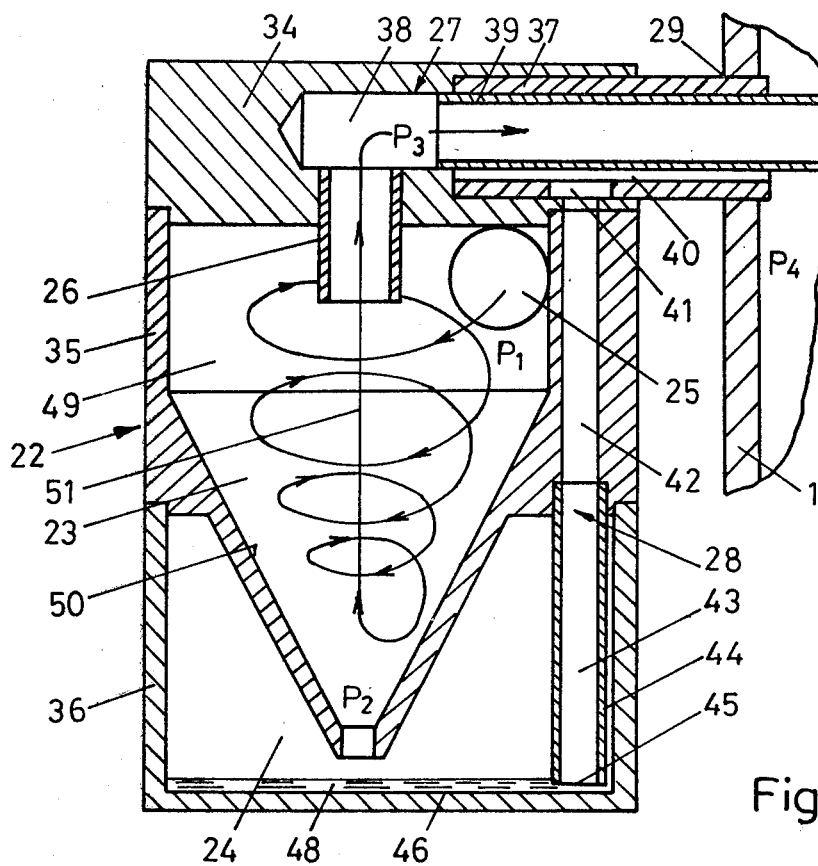

United States Patent [19]
Dyhr et al.

[11] 4,142,380
[45] Mar. 6, 1979

[54] ENCAPSULATED REFRIGERATOR

[75] Inventors: Jan Dyhr, Sonderborg; Ole J. Nissen, Augustenborg, both of Denmark

[73] Assignee: Danfoss A/S, Nordborg, Denmark

[21] Appl. No.: 849,110

[22] Filed: Nov. 7, 1977

[30] Foreign Application Priority Data

Nov. 8, 1976 [DE] Fed. Rep. of Germany ....... 2650935

[51] Int. Cl.² .......................... F25B 1/02; F25B 31/00; F25B 43/02
[52] U.S. Cl. ......................................... 62/471; 62/503
[58] Field of Search .................. 62/471, 468, 469, 503

[56] References Cited

U.S. PATENT DOCUMENTS

| | | | |
|---|---|---|---|
| 2,813,404 | 11/1957 | Hirsch | 62/471 |
| 3,154,245 | 10/1964 | Roelsgaard | 62/469 X |
| 3,177,680 | 4/1965 | Rasovich et al. | 62/471 |
| 3,304,697 | 2/1967 | Ramsey | 62/471 X |
| 3,304,741 | 2/1967 | Weller | 62/471 |
| 3,483,714 | 12/1969 | Krause et al. | 62/503 |

Primary Examiner—Stephen J. Novosad

Attorney, Agent, or Firm—Wayne B. Easton

[57] ABSTRACT

The invention relates to an encapsulated refrigerator assembly of the type in which an integrated motor and compressor unit is resiliently mounted in a hermetically sealed casing or capsule. An oil sump at the bottom of the capsule is provided for lubricating oil. An externally disposed centrifugal separator with an oil collecting tank at the bottom thereof provides refrigerant in vapor form for the compressor and oil for the oil sump. The compressor has a main inlet for receiving refrigerant vapor from the separator and a throttled inlet for receiving a refrigerant vapor which is present in the capsule and which entered entrained in the oil received from the separator. The capsule has a single port and two tubes extend from this single port to the separator. An outer tube provides fluid communication between the separator oil collecting tank and the interior of the capsule which houses the motor and compressor unit. A second or inner tube inside the outer tube is spaced therefrom and provides fluid communication between separator vapor outlet and the inlet of the compressor.

7 Claims, 2 Drawing Figures

U.S. Patent    Mar. 6, 1979    4,142,380

ENCAPSULATED REFRIGERATOR

The invention relates to an encapsulated refrigerator in which the interior of the capsule comprises an oil sump and the suction conduit extends from a passage in the capsule wall direct to the suction side of the refrigerant compressor.

In a known refrigerator of this type, the suction conduit is connected direct to the suction side of the refrigerant compressor so that suction gas that is as cold as possible reaches the compressor. In this way the compressor temperature can be reduced and the refrigeration effect increased. Part of the compressed refrigerant passes into the interior of the capsule during each compression stroke through a gap between the piston and the cylinder. The interior of the capsule therefore has a pressure which is higher than the suction pressure and less than the liquefying pressure.

In another known refrigerator of the aforementioned kind, the compressed refrigerant is returned to the interior of the capsule through a precooler and then discharged. The interior of the capsule is therefore at the liquefying pressure.

In both cases, it is a disadvantage that the impurities carried along by the suction gas remain in the circuit. Dirt particles can block valves and capillary tubes. If the oil that is carried along accumulates, it is no longer available for lubricating and cooling purposes. Liquid refrigerant droplets must under no circumstances reach the cylinder because the suction valve can otherwise be destroyed by high pressure increases.

It is also already known to connect a liquid separator upstream of a non-encapsulated refrigerator, which separator is in the shape of a pot with an inlet connector and an outlet connector at the top, a baffle wall being arranged at a small spacing in front of the inlet connector. At the base there is a collecting chamber for the separated liquid connected by a down conduit to a crank housing having an oil sump. This conduit contains a slide valve which separates the collecting chamber and crank housing from each other.

The invention is based on the problem of providing an encapsulated refrigerator of the aforementioned kind which permits the suction gas to be fed to the compressor as cold as possible but at least without any liquid impurities.

This problem is solved according to the invention in that outside the capsule a liquid separator is connected in the suction conduit and that to withdraw the liquid a liquid conduit extends from the collecting chamber for the liquid into the capsule and the capsule interior is kept approximately at suction pressure.

With this construction, all liquid particles such as oil and liquid refrigerant are removed from the suction gas before it enters the compressor. Since no counter-pressure is built up in the capsule, the liquid can be led off into the capsule by way of the liquid conduit. In the capsule, the oil reaches the oil sump and liquid refrigerant can evaporate in the vicinity of the warm motor compressor.

It is particularly favorable if the liquid separator is a centrifugal separator with a vertical axis, collecting chamber at the bottom, tangential inlet connector at the top and a central immersed outlet tube. Such centrifugal separators which are known per se have the peculiarity that a pressure higher than the outlet pressure is built up in the collecting chamber. Consequently a pressure difference is available between the pressures in the collecting chamber and in the interior of the capsule, which difference can be utilized to withdraw the liquid. In particular, it is even possible for the liquid to overcome certain elevations in the liquid conduit.

With particular advantage, the liquid conduit starts with a rising section. This can for example be formed by a vertical passage which starts at a spacing from the base of the collecting chamber. In this way a kind of liquid seal is formed which permits the pressures in the collecting chamber and in the interior of the capsule to be built up substantially independently from one another. As soon as the liquid level falls below the upper edge of the inlet cross-section, the withdrawal of liquid is reduced to that quantity which is newly separated.

With particular advantage, the liquid conduit and the suction conduit form two channels in a common passage of the capsule wall. Only one aperture need therefore be provided in the wall of the capsule. The separation between the two passages can be very simply constructed because there are no large pressure differences. In particular, an internal tube for the suction gas can be disposed in a lead-through tube and the cross-section remaining between the tube can serve as a liquid conduit.

It is also favourable if the passage is at the level of the upper portion of the centrifugal separator and the liquid conduit has a section rising above the height of the centrifugal separator. In this way the suction conduit has the shortest possible length between the liquid separator and capsule and consequently practically no temperature drop. The pressure drop of a centrifugal separator is also very small and particularly when there is such a short outlet passage. The pressure being formed in the collecting chamber of the centrifugal separator enables the liquid to be readily driven above the height of the separator.

Further, the centrifugal separator may be freely suspended from the capsule by the lead-through tube. Since it can be very small as a whole, it requires no other fixing.

The suction pressure in the interior of the capsule is preferably maintained in such a way that it is connected to the suction side of the compressor by a throttle passage. The throttle passage ensures that only a part of the gaseous refrigerant that is small in comparison with the directly supplied suction gas can be sucked along this path. Because of the throttling, when the compressor is switched off the pressure in the liquid separator rises more rapidly than in the interior of the capsule, so that liquid is pressed out of the liquid conduit into the capsule and a pressure balance is subsequently brought about. Further, foaming of the oil during starting is considerably reduced.

One obtains a very short suction conduit in the interior of the capsule and a correspondingly low amount of cooling of the suction gas if in the case of a motor compressor with vertical axis the passage is disposed below the compressor head, the passage as well as the compressor connection at the suction side are provided with tube connectors which are mutually staggered substantially in the direction of the motor axis, and a substantially stiff connecting tube is connected to the two tube connectors by a respective joint.

Figure 1:
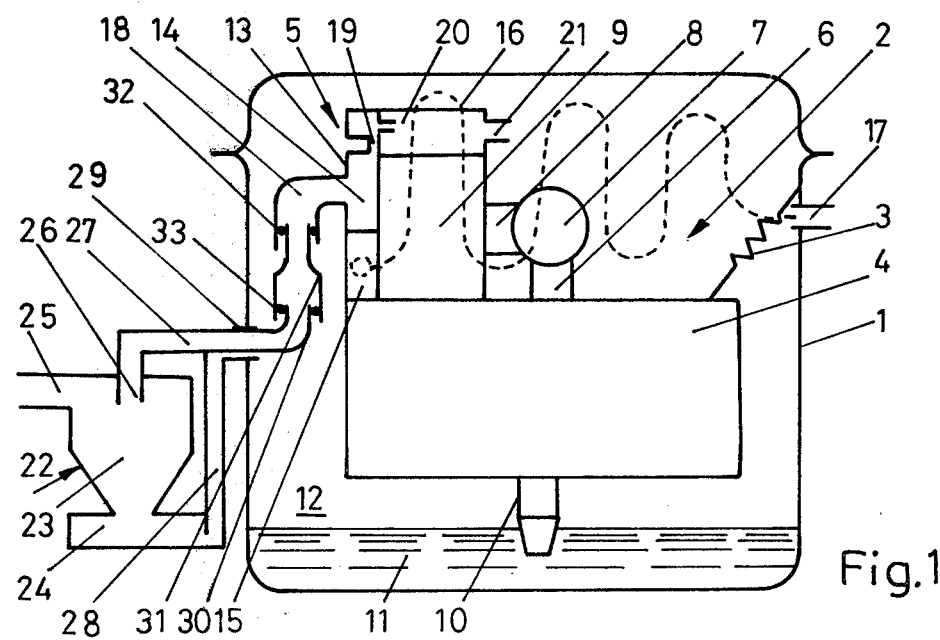

The invention will be described in more detail with reference to an example illustrated in the drawings, wherein:

FIG. 1 is a diagrammatic representation of a refrigerator according to the invention, and FIG. 2 is a constructional embodiment of a centrifugal separator mounted on the capsule.

FIG. 1 shows a capsule 1 in which a motor compressor 2 is suspended from springs 3. The motor compressor consists of an electric motor 4 and a piston compressor 5. By way of its shaft 6 and a crank slot 7, the motor reciprocates a compressor piston 8 in a cylinder 9. An oil conveyor 10 dips into an oil sump 11 which accumulates at the bottom of the interior chamber 12 of the capsule 1.

A cylinder cover or head 13 comprises a suction valve chamber 14 and a pressure valve chamber 15 which communicate through suction and pressure valves (not shown) with the suction chamber of the compressor 5. The pressure valve chamber 15 is connected by a winding pressure conduit 16 (shown in broken lines) to a passage 17 to which a condenser can be connected. The suction valve chamber 14 is provided on one side with a suction connector 18 and on the other side communicates by way of a throttle passage 19 with at least one sound-proofing chamber 20 which has an inlet connector 21 opening into the interior 12 of the capsule.

On the outside of the capsule 1 there is a centrifugal separator 22 comprising a separating chamber 23 which has a vertical axis and is cylindrical at the top and conical at the bottom. At the bottom there is a collecting chamber 24 for liquid. An inlet connector 25 is provided at a tangent at the top and also a central immersion tube 26 which extends substantially above the height of the inlet cross-section. A suction gas passage 27 leads from the immersion tube and a liquid conduit 20 from the collecting chamber 24 to a passage 29 in the wall of the capsule.

The gas passage 27 comprises a connector 30 arranged beneath the suction connector 18 of the compressor head 13. Both connectors face one another and extend substantially parallel to the axis of the motor compressor 2. Both connectors are telescopically surrounded by a substantially stiff connecting tube 31 which, together with each connector, forms a joint together with an O-sealing ring 32 or 33 serving as a damping element. By reason of these joints, the motor compressor can move freely at its resilient suspension.

FIG. 2 shows an embodiment of the centrifugal separator 22. It has a three-part housing consisting of a cover 34, a central member 35 which substantially bounds the separating chamber, and a pot-shaped base 36 which substantially bounds the collecting chamber 24. A lead-through tube 37 serving as a passage is inserted in the cover 34 and carries the entire centrifugal separator. The suction gas passage 27 is formed by a hole 38 and an adjoining internal tube 39 which so extends within the lead-through tube 37 that a gap 40 remains at the underside between the two tubes to form a part of the liquid conduit 28. This gap communicates with the liquid chamber 24 through an aperture 41 in the lead-through tube 37, a hole 42 in the central portion 35 and a passage 43 within a tube 44. The tube 44 has an inlet cross-section 45 which terminates at a spacing above the base 46 of the collecting chamber 24.

In operation, suction gas is sucked into the separator 22 during the suction stroke by way of the tangential inlet connector 25. This suction gas is thereby given a swirling motion along the line 49, heavier particles such as liquid droplets and dirt particles moving outwardly by reason of the centrifugal effect and then along the conical face 50 downwardly into the collecting chamber 24. The cleansed suction gas then moves substantially vertically upwardly along the line 51 and reaches the suction valve chamber 14 by passing through the immersion tube 26 and the suction gas conduit 27, through the passage 29 and by way of the articulated tube 31 and the suction connector 18. In accordance with the flow of the gas, the pressure in the centrifugal separator drops from a pressure $p_1$ at the inlet connector 25, through a pressure $p_2$ in the region of the collecting chamber 24 to a pressure $p_3$ in the suction passage 27. Suction gas is simultaneously sucked into the suction valve chamber 14 from the interior 12 of the capsule 1 by way of the sound damper 21 and the throttle passage 19. In the interior 12 of the capsule there is therefore a pressure $p_4$ which is roughly the same as $p_2$ but in every case less than the pressure $p_2$ in the collecting chamber. Consequently the liquid 48 is subjected to a pressure difference $p_2-p_4$ which enables liquid to be pressed into the capsule by way of the liquid conduit 28 and the passage 29. This occurs until the level of the liquid has reached the height of the inlet cross-section 45. The liquid level then remains at substantially this height, i.e. during operation of the motor compressor, the same amount of liquid, mixed with some gas, is withdrawn through the conduit 28 as is separated. The returned oil is again available for lubricating and cooling purposes. Liquid refrigerant can evaporate in the interior of the capsule and then again be returned to the cycle by way of the throttle passage 19.

During standstill, it can happen that liquid is accumulated to a higher level in the centrifugal separator 22 through condensation. Under the influence of the pressure difference, this liquid is returned into the capsule 1 on commencement of operation until the illustrated level is reached again.

The centrifugal separator can be of very small construction. For a refrigerator intended for domestic purposes, a total height of about 6 cm and an external diameter of about 4 cm will suffice. It gives rise to a pressure drop of about 0.03 bar. Bores of 3 mm diameter were used for the liquid conduit 28 and tube diameters of 5 mm for the suction conduit 27.

We claim:

1. An encapsulated refrigerator assembly, comprising, a capsule having an oil sump at the bottom thereof, an integrated motor unit and compressor unit mounted in said capsule, said compressor unit having compressor inlet means, a separator having an oil collecting chamber at the bottom thereof, a refrigerant gas outlet at the top of said separator and a liquid outlet at the bottom thereof for said collecting chamber, port means in said capsule, first fluid passage means connecting said separator gas outlet to said compressor inlet means through said capsule port means, and second fluid passage means providing communication between said collecting chamber liquid outlet and the interior of said capsule through said capsule port means, said second fluid passage means including a passage in said collecting chamber to the top of said separator.

2. A refrigerator assembly according to claim 1 wherein said capsule port means is a single opening for accommodating said first and second fluid passage means.

3. A refrigerator assembly according to claim 1 wherein said second fluid passage means includes a first tube extending from said separator to said capsule port means, said first fluid passage means including a second tube inside said first tube in spaced relation thereof.

4. A refrigerator assembly according to claim 3 wherein said separator is a centrifugal separator with a tangential inlet connector, said first and second tubes being in said separator above the level of said inlet connector.

5. A refrigerator assembly according to claim 3 wherein said first tube is the sole support of said separator relative to said capsule.

6. A refrigerator assembly according to claim 1 wherein said compressor inlet means include throttle means providing fluid communication between the interior of said capsule and the suction side of said compressor unit.

7. A refrigerator assembly according to claim 6 wherein said compressor inlet means includes suction valve chamber, said throttle means and said first fluid passage means being connected to said suction valve chamber.

* * * * *